Patented June 1, 1937

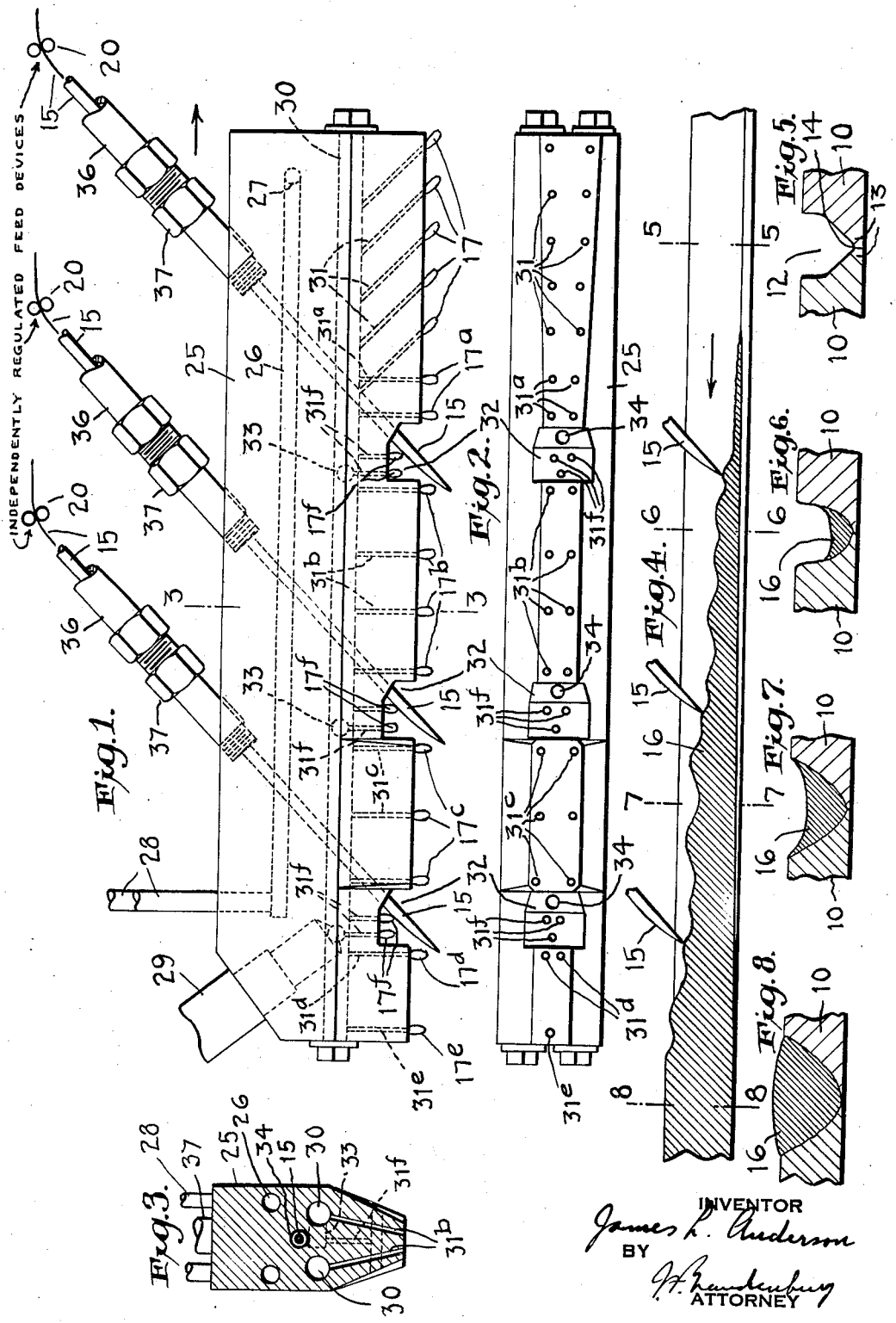

2,081,897

UNITED STATES PATENT OFFICE 2,081,897

PROCESS AND APPARATUS FOR FUSION WELDING

James L. Anderson, Closter, N. J., assignor to Air Reduction Company, Incorporated, New York, N. Y., a corporation of New York Application October 2, 1934, Serial No. 746,485

8 Claims. (Cl. 113—59)

This invention relates to the art of progressively welding joints between metal parts by the application of high-temperature gas flames and the addition of molten metal. For the welding of relatively thick parts, it is customary to prepare the edges to be united by so shaping them that, when the edges are disposed in juxtaposition, a trough is formed. Whether the extreme edges of the parts actually touch each other at the bottom, or whether the parts are arranged to provide a narrow slot through the bottom of the trough, inaccuracies in the formation of the edges or irregularities in their relation to each other are factors which affect the welding operation. With more separation between the edges or lips forming the bottom of the trough, the radiant and conveyed heat of the flames act upon them more readily, whereas where the interior edge portions are closer together or in actual contact their opposing faces are brought to melting more slowly, conduction through the solid metal then being more of a factor. Uninterrupted welding, complete weld penetration throughout the extent of the seam, or the production of welds having little or no projection at the under side, if that is required, may be difficult of achievement.

In high speed welding, more especially with machine operation in which either the work or the torch is continuously driven in relation to the other, conditions may be quite critical, calling for more adjustment of the heat than is practicable. In consequence, there are apt to be variations in penetration in different portions of the weld, or there may be irregular bottom protrusions. Furthermore, while molten metal will maintain itself and solidify in a bottom interval of proper narrowness, if, because of pre-existing conditions or otherwise, a more substantial opening occurs in the bottom of the trough so that the molten metal pours through, the orderly formation of the weld is totally disturbed and it becomes necessary to stop the operation and endeavor to repair the damage.

It is known to weld seams with a seamwise extended system of oxyacetylene flames, intermediate the ends of which a welding wire or rod is fed at a region where the sides and bottom of the trough have been preheated and melted.

In accordance with this invention a plurality of weld wires or rods are fed to the seam or to the trough simultaneously, at regions spaced lengthwise of the seam and within the limits of the flame system. With this method much higher welding speeds are possible and the production of welds of uniform excellence is made easier, whether the welds are of the filled trough type or not.

More specifically, however, the first rod is fed and melted at a region where suitable preheating flames have raised the temperature of the walls and bottom of a trough or groove and brought the parent surfaces to fusion or at least to such state that they will bond strongly with added metal. By the metal thus deposited, which is less than the amount required to make the weld, the bottom of the trough is protected, with the result that otherwise adverse factors are neutralized. While this is being accomplished, the addition of metal from one or more wires fed in at the more rearward regions builds up the elongated weld puddle. The augmenting of the puddle and the manner in which it is controlled until a weld of desired depth and conformation is obtained may be varied by the number and spacing of the rods, the extent of the flame system and the number, disposition, and special application of the jets that compose it. The bottom of the trough having been sufficiently heated or melted by the leading flames and having been then covered by a part of the filling material, gradual transmission of heat downward through the puddle as the heating is continued by successive flame, while more metal is added, causes the fusion to work downward to a complete and even penetration.

Objects of the invention are to eliminate critical adjustments, to prevent loss of the weld puddle and consequent interruption of the work, and to make it possible to obtain welds that are satisfactory or that will comply with exacting requirements throughout the extent of the seam, at linear speeds much higher than have been practicable. A further feature of the invention is that the feed of the separate partial supplies, i. e. the wires or rods, may be regulated independently.

In addition to the foregoing, it is an object of the invention to provide an improvement in wire-feed welding torch apparatus with which more rapid and successful welding may be performed, and which is especially suitable for the carrying out of the process of the invention.

In the accompanying drawing, forming part hereof:

Fig. 1 is a side elevation of a torch tip block suitable for the carrying out of a process and constituting an embodiment of the apparatus of the invention. Parts connected with the tip block are broken away, the wires or rods being fed are shown and the cones of flame jets delivered from the jet passages of the torch are schematically represented.

Fig. 2 is a bottom plan view of the torch shown in Fig. 1.

Fig. 3 is a cross-section taken on the line 3—3 of Fig. 1.

Fig. 4 is a longitudinal section through the weld in process of production, the ends of the welding rods being shown.

Figs. 5 to 8 are cross-sections taken on the lines 5—5, 6—6, 7—7 and 8—8, respectively, of Fig. 6.

The parts 10, 10 represent the juxtaposed portions of comparatively heavy metal material. The operation illustrated is the welding of a straight-line seam, but it will be understood that the invention is applicable to the welding of girth joints or other joints between parts which are curved in planes parallel to the central plane of the seam. Fig. 5 illustrates one form that the trough 12 between heavy parts may take. The edges of the parts to be united have been machined or otherwise shaped to constitute trough sides, the upper portions of which are vertical and the lower portions of which slope to form a V. This form is not essential, since there may be a simple V or any other suitable shape of trough. At the bottom of the trough the lips 13 of the parts might come to a sharp or feather edge of no depth, that being known, but for machine welding operations it is advisable to form the lips as shown, so that they present to each other more or less vertical faces 14 of some slight depth, the result being that there is a thickness of parent metal at the very bottom of the trough. The drawing shows these inferior edge faces as if in actual contact, but it will be understood that this is not always the case, and that there is necessarily something of a crevice at the bottom of the trough, which is apt to amount to a spacing at numerous regions because of irregularities in the formation of the edges. In order to obtain a weld of complete penetration but with substantially no projection at the under side, it is advantageous for the purpose of this invention to place the edges substantially as close together as inaccuracies will permit and to provide some thickness of metal at the extreme lower edges.

The faces and bottom of the trough are preheated and gradually brought to fusion, the weld wires 15 are melted into the trough, the long puddle 16 is kept molten as the quantity of melted metal in the seam is increased, and the melting of parent metal is continued, by the heat supplied by numerous high-temperature flame jets 17, 17a, etc., preferably of the oxyacetylene mixture, distributed over a substantial length of the seam. The weld wires are fed to the seam in tandem, spaced relation so that their ends are presented to the puddle one behind another with reference to the direction of the seam and at such distance apart that the heat of the jets is effectively utilized in melting them and incorporating this material in the weld. The relation of the wires as they are fed to the jets of the flame system is of moment, and the preferred form of execution will be described later in more detail.

Figs. 4 to 8, taken in connection with the other views of the drawing, illustrate the process. By the plate preheating jets 17 and the jets 17a next following, the inferior surfaces between the parts 10 are heated by degrees but rapidly until they melt, or until a condition in the nature of incipient surface fusion is produced. Before any pre-existing gap at the bottom of the trough, not wide enough to allow molten metal to flow through, has become sufficiently widened by melting to permit escape of metal or to result in an undesired projection of the weld from the bottom of the seam, and before any hole cavity can be melted in the bottom of the trough, molten metal from the first wire is deposited. This covering in the bottom of the trough opposes a molten dam to the intensely hot gases which theretofore might go down between the lip edges and prepare for the welding of the extreme bottom of the seam. As the heating continues under additional flames 17b between the regions of feeding in of the first and second wires, the molten metal is kept molten while the amount of it may be increased by the melting of parent metal. Then fluid metal is added from the second wire, and under other jets 17c the fluid consistency of the pool is maintained and involvement of the parent metal may continue, after which metal from still another wire may be added to complete the weld. Other jets 17d play immediately behind this region, and the top of the weld mass may be smoothed by a final jet 17e or a plurality of such jets. The melting of the lower portions of the wire is effected by the heat of jets in the vicinity of the places where they issue, and by the radiant heat in the space above the weld. Jets 17f delivered adjacent the wires, at points higher up than the general system of jets, assist the operation.

By melting metal from two or more separated wire supplies, no one of which furnishes the entire amount of filling material, it is possible to make welds at decidedly increased linear speeds; moreover, each wire may be smaller than a single wire would have to be and therefore more readily melted. The melted metal first introduced into the trough, and thereafter added to, not only serves as a barrier to the direct action of flame gases on the underlying solid metal and edge extremities, but, because of its relatively low heat conductivity, minimizes danger of any undue melting at the bottom resulting from conducted heat. By proper coordination of the amount and distribution of the applied heat and the places where and the rates at which the wires are fed in, welds of desired top contour and of full penetration but without any undesired amount of bottom projection, or without any such projection, are easily made at high welding speeds.

The individual wires are fed by independently regulated, adjustable-speed feed devices 20, such as shown in Patent 1,903,953 for example. These devices are indicated diagrammatically and by legend in Fig. 1 of the accompanying drawing. An advantage of taking the total amount of weld filler metal from a plurality of supplies in the manner of this invention is that the amounts of metal deposited at the different regions can be adjusted in relation to each other by regulating the rates at which the separate wires are fed, this being easy to do whereas regulating the heating at different regions would be difficult or impracticable. Thus, the protection of the trough bottom and the desired penetration are controlled by feeding somewhat more or less wire in the first instance, in conjunction with proper adjustment of the additional supply or supplies. The first deposit of molten metal is placed in the trough at a region considerably in advance of the place where a single wire, furnishing the entire supply as in prior practice, would be introduced, and it is necessary to avoid putting in so much at this forward region that the metal would flow so far ahead that it would encounter parent metal surfaces not yet hot or fused enough to insure a strong union.

The rate of feed of the second wire is regulated to add sufficient metal to further blanket the bottom of the trough and insure against melting through the trough bottom, but the rate of feed is limited in proportion to the welding speed so that the amount of metal added is somewhat less than required to fill the trough completely. At high welding speeds the second wire can be fed as fast as it will melt because the flames will not melt the rod fast enough to fill up the trough completely. The rate of feed of the last wire is used to control the contour of the weld. If a flush weld is wanted, the rate of feed will be made somewhat greater than if a depressed weld is desired. Still faster feed is necessary to produce a raised or "reinforced" weld.

The torch illustrated in the drawing has a long multiple-jet tip block 25 having provisions at 26, 27, 28 for water-cooling. The gas mixture is delivered into the tip block, from a suitable mixer not shown, through a stem 29, and flows lengthwise of the block in laterally spaced manifold chambers 30. The flame jets to which reference has been made are delivered from jet passages extending from the manifold chambers to the under part of the block. The jets and jet passages are disposed in a general double-row system, but the transverse spacing of the jet orifices and also their inclinations are preferably varied in different parts of the system in order that specialized functions may be effectively performed. The trough preheating jet passages 31 are inclined forwardly in order to sweep the hot gases ahead and effect more efficient pre-heating of the parent metal. The orifices of these lines of jet passages are also farthest apart crosswise of the torch block at the front end, while toward the rear the spacing becomes progressively less. The passages 31$^a$, 31$^b$, 31$^c$ and 31$^d$, from which, respectively, the jets 17$^a$, 17$^b$, 17$^c$ and 17$^d$ issue, are substantially perpendicular in side elevation and incline inward in cross-section. The wire preheating jets 17$^f$ are delivered from groups of passages 31$^f$ of three passages each, which open into cavities 32 cut upward in the block from the bottom. Those of the passages 31$^f$ that are centrally located, as well as the smoothing jet passage 31$^e$, are supplied from cross chambers opening out of one of the longitudinal manifold chambers, one such cross chamber being indicated at 33 in Fig. 3.

Wire feed channels 34 extend obliquely downward through the tip block from the top of the cavities 32, the inclination from top to bottom being rearward. The wires 15 are guided to these channels through tubular conduits 36, which extend between the feed devices 20 and fittings 37 inserted in the top of the tip block. Needless to say, the wire feed devices are supported at a suitable distance from the block.

Either the torch or the work is driven in continuous motion in the direction of the length of the seam. If the torch is driven it is moved in the direction of the arrow of Fig. 1, whereas if the torch is kept stationary the work is moved in the direction of the arrow of Fig. 4.

The mode of operation of the apparatus will be fully understood from the foregoing description and the explanation of the welding process.

It will be appreciated that the carrying out of the process and the construction of the apparatus may be modified without departing from the scope of the invention as defined in the claims.

I claim:

1. The process of welding contiguous portions of metal material which comprises progressively applying the heat of high-temperature flames covering a substantial portion of the extent of the seam, simultaneously feeding a plurality of wires one behind another at spaced points lengthwise of the seam, and melting from each wire a portion of the added metal required to make the weld while maintaining the metal between said spaced points in molten condition.

2. The process of welding contiguous portions of metal material which comprises maintaining by the heat of high-temperature flames and the addition of metal an elongated puddle which progresses along the seam and continuously solidifies at the rear end to form the weld, and adding metal by depositing it from a plurality of wires spaced lengthwise of the seam and so introduced that the puddle is built up by successive deposits.

3. The process of welding contiguous portions of metal material which have their edges so shaped and in such relation that they form a trough, the said process comprising progressively applying to said portions the heat of high-temperature flames, and by such flames fusing the trough faces and melting metal from a weld wire into the trough to form a protective deposit of molten metal over the bottom of the trough while simultaneously, at another region or regions in tandem relation lengthwise of the seam, adding more metal to complete the weld and maintaining the metal in molten condition between the points where metal is added.

4. The process of welding contiguous portions of metal material which comprises progressively applying to the portions the heat of a seamwise-extended system of flame, simultaneously adding molten metal from weld wires at a plurality of regions spaced along the intense heat zone while maintaining the metal in a molten condition between said regions, and regulating the amount of metal added at one region in relation to the amount added at another region to obtain the desired weld contour.

5. The process of fusion welding a seam between contiguous portions of metal material having their confronting edges shaped to form a trough, which process comprises progressively applying to the portions the heat of a seamwise-extended system of flame and melting the faces of the trough with the forward portion of said flame system, and at one or more points behind said forward portion melting additional metal into the trough from weld wires arranged in tandem lengthwise of the seam while maintaining the metal in molten condition between said points, and controlling the melting of the bottom of the trough and the penetration of the weld by depositing a part of the added metal immediately behind the forward portion of the flame system so that the added metal protects the bottom of the trough from the direct heat of the flame system beyond said forward portion.

6. A welding torch apparatus comprising means for delivering a number of high-temperature flames in a seamwise-extended system, and means for feeding within the system a plurality of weld wires at spaced points lengthwise of the seam so that their ends are presented to the seam in tandem relation, some of said means for delivering high-temperature flames being located between the spaced points at which the weld wires are fed to maintaining the metal therebetween in a molten condition.

7. A welding torch apparatus comprising means for delivering a number of high-temperature flames in a seamwise-extended system, and means for feeding within the system a plurality of weld wires at spaced points lengthwise of the seam so that their ends are presented to the seam in tandem relation, some of said means for delivering high-temperature flames being located between the spaced points at which the weld wires are fed to maintain the metal therebetween in a molten condition and said means for feeding including independently regulated feed devices for the respective weld wires.

8. The method of welding a seam between adjacent sections which have their edges so shaped that they form a trough, which method comprises directing against the metal edges a seamwise-extending system of flame of sufficient power to melt through the bottom of the trough if allowed access to said edges throughout the length of the system of flame, melting metal from a weld wire into the trough near the forward end of the system of flame to form a protective layer of molten metal over the bottom of the trough, and simultaneously melting one or more other weld wires into the seam at one or more points spaced rearwardly from the first weld wire, while maintaining the metal between the weld wires in a melted condition.

JAMES L. ANDERSON.